(12) United States Patent
Seilmeier et al.

(10) Patent No.: US 11,539,318 B2
(45) Date of Patent: Dec. 27, 2022

(54) METHOD FOR DETERMINING A CORRECTION VALUE WHICH DESCRIBES AN ANGULAR DIFFERENCE BETWEEN AN ASSUMED AND AN ACTUAL POSITION OF A D-AXIS, CONTROL DEVICE AND INVERTER

(71) Applicant: Valeo Siemens eAutomotive Germany GmbH, Erlangen (DE)

(72) Inventors: Markus Seilmeier, Fürth (DE); Andreas Held, Fürth (DE); Andreas Walter, Nuremberg (DE); Hans-Georg Köpken, Erlangen (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 0 days.

(21) Appl. No.: 17/279,319

(22) PCT Filed: Sep. 20, 2019

(86) PCT No.: PCT/EP2019/075303
§ 371 (c)(1),
(2) Date: Mar. 24, 2021

(87) PCT Pub. No.: WO2020/064536
PCT Pub. Date: Apr. 2, 2020

(65) Prior Publication Data
US 2021/0399662 A1 Dec. 23, 2021

(30) Foreign Application Priority Data
Sep. 28, 2018 (DE) .................... 10 2018 124 105.4

(51) Int. Cl.
*H02P 21/14* (2016.01)
(52) U.S. Cl.
CPC .................... *H02P 21/14* (2013.01)

(58) Field of Classification Search
CPC .......... H02P 21/14; H02P 21/00; H02P 21/06; H02P 27/06; H02P 21/10; H02P 21/18;
(Continued)

(56) References Cited

U.S. PATENT DOCUMENTS 9,050,895 B2 6/2015 Kobayashi et al.
2004/0061461 A1* 4/2004 Tajima ................. B60L 15/025
318/700

(Continued)

FOREIGN PATENT DOCUMENTS

DE     102012215042 A1   10/2013
EP     3208935 A1         8/2017
JP     5847166 B2 *       1/2016  ............. H02P 21/22

OTHER PUBLICATIONS

PCT/ISA/210, "International Search Report for International Application No. PCT/EP2019/075303," dated Jan. 22, 2020.
(Continued)

*Primary Examiner* — Bickey Dhakal
(74) *Attorney, Agent, or Firm* — Manabu Kanesaka

(57) ABSTRACT

A method determines a correction value for a control device for an electric machine, which describes an angular difference between a position of a d-axis of the electric machine and an actual position of the d-axis. The correction value is determined in a rotating state of a rotor of the electric machine as a function of a d voltage value describing a d component of a stator voltage specified by the control device in the initial configuration, of a q voltage value describing a q component of the stator voltage specified by the control device in the initial configuration, of a flux value describing a magnetic flux of the rotor, a speed value describing the speed of the rotor in the rotating state, and of a calibration value describing a speed-dependent voltage error of the d component of the stator voltage.

14 Claims, 5 Drawing Sheets

(58) Field of Classification Search
CPC .. H02P 6/18; H02P 21/22; H02P 21/24; H02P 2203/03; H02P 21/32; H02P 21/34
See application file for complete search history.

(56) References Cited

U.S. PATENT DOCUMENTS

| | | | |
|---|---|---|---|
| 2013/0033207 A1* | 2/2013 | Satou | H02P 21/18 318/400.04 |
| 2013/0275069 A1* | 10/2013 | Bang | B60L 15/025 702/94 |
| 2019/0157957 A1* | 5/2019 | Rho | B60L 15/025 |
| 2019/0393819 A1* | 12/2019 | Hao | H02P 21/22 |

OTHER PUBLICATIONS

M. Seilmeier et al, "PMSM Model for Sensorless Control Considering Saturation Induced Secondary Saliencies," IECON 2014—40th Annual Conference of the IEEE Industrial Electronics Society, Dallas, TX, 2014, pp. 634-640.

M. Seilmeier et al, "Impact of Iron Losses and Parameter Errors on Back-EMF based Sensorless Control of PMSM," IECON 2014—40th Annual Conference of the IEEE Industrial Electronics Society, IEEE, Oct. 29, 2014, p. 634-640, DOI: 10.1109/IECON.2014.7048567, XP032739245.

\* cited by examiner

METHOD FOR DETERMINING A CORRECTION VALUE WHICH DESCRIBES AN ANGULAR DIFFERENCE BETWEEN AN ASSUMED AND AN ACTUAL POSITION OF A D-AXIS, CONTROL DEVICE AND INVERTER

RELATED APPLICATIONS

The present application is National Phase of International Application No. PCT/EP2019/075303 filed Sep. 20, 2019, and claims priority from German Application No. DE 10 2018 124 105.4 filed Sep. 28, 2018, the disclosure of which is hereby incorporated by reference herein in its entirety.

BACKGROUND OF THE INVENTION

The present invention relates to a method for determining a correction value for a control device for an electric machine, wherein the correction value describes an angular difference between a position of a d-axis of the electric machine assumed in an initial configuration of the control device based on rotor position information of a rotor position sensor and an actual position of the d-axis. In addition, the invention relates to a control device, an inverter, a vehicle, and a computer program product.

A field-oriented control of electrical machines requires a determination of a position of a d-axis. Typically, the rotor position information is provided by a rotor position sensor and describes a relative position of a rotor of the electrical machine to its stator. In this case, a zero axis of the rotor position encoder does not correspond to the d-axis of the electric machine, for example due to mounting inaccuracies. Such a deviation of the zero axis from the d-axis is referred to as an offset, the position of which can be determined from the rotor position information.

Based on a counter-electromotive force generated by the rotor, a correction value can be determined in an initial configuration with uncertain angular difference of an assumed position of the d-axis to the actual position of the d-axis, which describes, as it were, an angular difference between the offset in the initial configuration and the actual offset.

Especially in automotive applications, precise control of a torque generation by the electric machine is important. While offset errors have a relatively small effect on generated torque in maximum torque per ampere (MTPA) operation, knowledge of the offset becomes more important as the speed of the electric machine or vehicle increases, since in an operating range near a voltage ceiling, an offset error has a high effect on the error of generated torque. An inaccurate knowledge of the offset can then lead to reduced efficiency of the electric machine or to deviations between requested and actual torque.

Document EP 3 208 935 A1 discloses a test method for an electric drive in which a rotor of the electric machine is rotated in different directions of rotation to determine an offset, and a quality measure for a determined position of a d-axis is determined based on reactions of the drive.

Determining the offset in this way by rotating the rotor several times in two different directions of rotation improves the accuracy of the determined d-axis, but is only feasible at great expense.

The invention is therefore based on the object of providing an improved method for determining the correction value, which in particular can be carried out with less effort.

SUMMARY OF THE INVENTION

To solve this problem, according to the invention a method for determining a correction value for a control device for an electric machine is proposed, wherein the correction value describes an angular difference between a position of a d-axis of the electric machine assumed in an initial configuration of the control device on the basis of rotor position information of a rotor position sensor and an actual position of the d-axis, wherein a zero current is impressed in stator windings of the electric machine and the correction value is determined in a rotating state of a rotor of the electric machine as a function of a d-voltage value, which describes a d component of a stator voltage specified by the control means in the initial configuration, a q voltage value which describes a q component of the stator voltage specified by the control means in the initial configuration, a flux value which describes a magnetic flux of the rotor, a rotational speed value which describes the rotational speed of the rotor in the rotating state, and a calibration value which describes a rotational speed-dependent voltage error of the d component of the stator voltage.

The invention is based on the realization that by operating the electric machine in different directions of rotation, the influence of iron losses and timing errors in the operation of the electric machine is compensated, but this can be simplified by taking this influence on the d-voltage value used into account by the speed-dependent calibration value. Such a calibration value may have been determined in advance of the determination of the correction value in general for a specific machine type and/or a specific inverter type. This enables a precise and at the same time low-effort determination of the correction value, since this can be determined in an operation of the electrical machine, in which only one direction of rotation is provided.

By the method according to the invention the conventional determination of the correction value based on the counter electromotive force on the basis of the voltage equations applicable to steady-state, current-free operation $$u_d = 0 \quad (1)$$

$$u_q = \omega_{el} \cdot \Psi \quad (2)$$

is supplemented by a consideration of the typically empirically determined stress error:

$$u_d = \Delta u_d(\omega_{el}) \quad (3)$$

$$u_q = \omega_{el} \cdot \Psi \quad (4)$$

Thereby in equations (1) to (4) $u_d$ describes the d-component of the stator voltage, $u_q$ the q-component of the stator voltage, $\omega_{el}$ the electric angular velocity, $\Psi$ the magnetic flux of the rotor and $\Delta u_d(\omega_{el})$ the speed-dependent voltage error of the d-component of the stator voltage represented by the calibration value. The voltage error can be attributed in particular to iron loss and timing error, which is described in detail in the article by M. Seilmeier and B. Piepenbreier, "Impact of iron losses and parameter errors on back-EMF based sensorless control of PMSM," IECON 2014—40th Annual Conference of the IEEE Industrial Electronics Society, Dallas, Tex., 2014, pp. 634-640.

The initial configuration typically refers to a condition in which the rotor position encoder is arranged with an unknown or uncertain offset and the control device assumes an estimated or approximate position of the d-axis. Consequently, an initial offset between a zero axis of the rotor position encoder and the assumed position of the d-axis may be specified in the initial configuration. After determining the correction value, a corrected offset, which is a difference between the initial offset and the correction value, can be used.

In the method according to the invention, the rotational speed value can describe the, in particular electrical, rotational speed as angular frequency or frequency. In principle, the calibration value can be static and the rotational speed in rotating operation can be fixed. Preferably, however, the rotational speed is variable and the calibration value is determined as a function of the rotational speed value. This allows the correction value to be determined during ongoing operation of the electric machine, in particular following initial startup of a vehicle having the electric machine for propulsion, after repair or maintenance of the vehicle, or for checking or recalibration during the vehicle's period of use.

Particularly preferably, the calibration value is read out from a stored characteristic diagram which assigns a calibration value to each of the speeds of the electrical machine. This enables a particularly simple calculation of the calibration value, since this can be determined once for a specific machine type and/or inverter type and stored in a memory unit of the control device. When carrying out the method according to the invention, it is then only necessary to refer back to the stored characteristic diagram in order to enable the precise and low-effort determination of the correction value. Alternatively, the correction value for a speed in the rotating state of the rotor is fixed.

Particularly preferably, the following equation is evaluated to determine the correction value:

$$\Delta\gamma_i = \alpha \tan(\omega_{el} \cdot \Psi \cdot u_d - \Delta u_d \cdot u_q, \Delta u_d \cdot u_d + \omega_{el} \cdot \Psi \cdot u_q), \quad (5)$$

where $\alpha \tan(x, y)$ describes an arc tangent function or an arcuscotangent function, in particular $$\arctan\left(\frac{x}{y}\right) \text{ or } \operatorname{arccot}\left(\frac{y}{x}\right)$$

or $\alpha \tan 2(x, y)$ or $\alpha \cot 2(y, x)$, $u_d$ describes the d-voltage value, $u_q$ describes the q-voltage value, $\Psi$ describes the flux value, $\omega$ describes the speed value, in particular as electrical angular frequency $\omega_{el}$ and $\Delta u_d$ describes the calibration value.

This equation is based on the knowledge that the relationships between the stator voltages in the initial configuration and the actual stator voltages can be described as follows:

$$\begin{pmatrix} u_d \\ u_q \end{pmatrix} = \begin{pmatrix} \cos\Delta\gamma & -\sin\Delta\gamma \\ \sin\Delta\gamma & \cos\Delta\gamma \end{pmatrix} \begin{pmatrix} u_{d_{init}} \\ u_{q_{init}} \end{pmatrix} \quad (6)$$

$$\begin{pmatrix} u_{d_{init}} \\ u_{q_{init}} \end{pmatrix} = \begin{pmatrix} \cos\Delta\gamma & \sin\Delta\gamma \\ -\sin\Delta\gamma & \cos\Delta\gamma \end{pmatrix} \begin{pmatrix} u_d \\ u_q \end{pmatrix} \quad (7)$$

Thereby $u_{d_{init}}$, $u_{q_{init}}$ describe the d and q components of the stator voltage in the initial configuration, $u_d$, $u_q$ the d or q component of the actual stator voltage, and $\Delta\gamma$ the correction value. It is then obtained from equations (3), (4), (6) and (7)

$$\begin{pmatrix} u_{d_{init}} \\ u_{q_{init}} \end{pmatrix} = \begin{pmatrix} \omega_{el} \cdot \Psi \cdot u_{d_{init}} & \Delta u_d \\ -\Delta u_d & \omega_{el} \cdot \Psi \end{pmatrix} \begin{pmatrix} \sin\Delta\gamma \\ \cos\Delta\gamma \end{pmatrix} \quad (8)$$

From this follows by solving (8) to $\Delta\gamma_i$ the equation (5). It should be noted that for $\Delta u_d = 0$ the conventional determination of the correction value follows.

In the process according to the invention, setpoint voltage values of a control unit of the control device can be used as the specified stator voltage. This means that there is no need to determine the stator voltage by measurement, since the setpoint voltage values are available with sufficient accuracy in the control unit itself. Particularly preferably, however, the specified stator voltage is determined from output signals of a modulator unit of the control device that provides switching signals for a power unit of an inverter. This allows an additional consideration of modifications of the stator voltage, which are made by the modulator unit, but not by the control unit. In this way, the correction value can be determined even more accurately because the d-voltage value and the q-voltage value are taken into account much more realistically.

Preferably, a permanently excited electric machine is used in the process according to the invention. The flux value can describe the magnetic flux of permanent magnets of the rotor. Alternatively, it is possible that an electrically excited electric machine is used. Then it is convenient that the flux value describes the rotor flux concatenated with the stator. In the case of an electrically excited electrical machine, it is further preferred that a minimum excitation current for rotor windings is specified when determining the correction value, so that the magnetic flux can be reliably determined.

Particularly preferably, the flux value is further determined as a function of the d-voltage value and the q-voltage value and the speed value. In this way, changes in the magnetic flux can be taken into account during the execution of the process, i.e. quasi online, which makes the determination of the correction value more precise. In a good approximation, the flux value can be determined according to the following formula:

$$\Psi = \frac{\sqrt{u_{d_{init}}^2 + u_{q_{init}}^2}}{\omega_{el}} \quad (9)$$

For an even more precise determination, the flow value can be determined in additional dependence of the calibration value. The flow value can then be determined according to the following equation:

$$\Psi = \frac{\sqrt{u_{d_{init}}^2 + u_{q_{init}}^2 - \Delta u_d^2}}{\omega_{el}} \quad (10)$$

Equation (9) represents an approximation of equation (10) for the case following:

$$\Delta u_d \ll u_{d_{init}}^2 + u_{q_{init}}^2 \quad (11)$$

According to a particularly advantageous further development, a determined correction value can be rejected as unreliable if the determined flux value is above a predetermined maximum flux value and/or if the determined flux value is below a predetermined minimum flux value. In particular, a low flux value that is below the predetermined minimum flux value may indicate that the permanent magnets are demagnetized in the case of the use of a permanently excited electric machine, especially if a maximum permissible magnet temperature of, for example, 140° C. has been exceeded. In this case, the determined correction value cannot be considered sufficiently reliable and is discarded. In this case, the stator voltage should be determined with a sufficient level of safety, for example by measuring the stator voltage or adequate safety mechanisms.

A determined flux value that is above the specified maximum flux value and/or below the specified minimum flux value may incidentally indicate that the stator voltage is implausible in relation to the determined magnetic flux. This may again be related to a too high magnet temperature, but also to a too low magnet temperature if an external temperature of the electric machine is below a permissible external temperature of −40° C., for example. It should be ensured that the electric angular velocity can be determined with a sufficient level of safety.

Particular advantages of the method according to the invention result if the d-voltage value, the q-voltage value and the speed value are determined as a function of mean values of respective individual values which are acquired over an acquisition period comprising one or more complete electrical or mechanical periods. In this way, the influence of harmonics and subharmonics, which can be attributed to non-sinusoidal counter-motor forces or stator slots, for example, can be compensated. Details can be found in the article by M. Seilmeier, S. Ebersberger and B. Piepenbreier, "PMSM model for sensorless control considering saturation induced secondary saliencies," 2013 IEEE International Symposium on Sensorless Control for Electrical Drives and Predictive Control of Electrical Drives and Power Electronics (SLED/PRECEDE), Munich, 2013, pp. 1-8.

In order to ensure that the mean values allow the elimination of these harmonic influences correctly, i.e. that a quasi-stationary operation of the electric machine may be assumed, a plausibility check checking a quasi-stationary operation of the electric machine can be performed during the acquisition of the single values and a correction value can be rejected as unreliable if the plausibility check shows a violation of a given condition for the quasi-stationary operation.

In detail, it can be provided for this purpose that the condition comprises that individual values used to determine the speed value lie within a predetermined speed interval and/or that a d current value describing an average value of individual values of a d component of a stator current detected during the detection period and a q current value describing an average value of individual values of a d component of the stator current detected during the detection period lie within a current interval comprising zero.

According to a particularly preferred further development, it is provided that several correction values are determined in a predetermined or predeterminable number of successive determination cycles and an overall correction value is used as the mean value of the correction values determined in the determination cycles if the number of correction values rejected as unreliable during the respective plausibility check does not exceed a predetermined maximum value and/or the deviation of the correction values determined in the determination cycles from one another does not exceed a predetermined deviation measure. In this way, the reliability level of the overall correction value can be further improved. For example, the deviation measure can be determined in such a way that a maximum value and a minimum value of the correction values not determined to be unreliable are compared with the mean value of the correction values not determined to be unreliable, whereby exceeding predetermined threshold values by the mean value through the maximum value and the minimum value leads to non-consideration as the overall correction value. It is convenient that the procedure is then carried out again, performing the successive determination cycles.

Conveniently, after determining the total correction value, a corrected offset, which is a difference between the initial offset and the total correction value, is used for further control of the electric machine.

In addition, the invention relates to a control device for an electric machine, which is adapted to impress a zero current into stator windings of the electric machine and to impress a correction value describing an angular difference between a position of a d-axis of the electric machine assumed in an initial configuration of the control device on the basis of rotor position information of a rotor position sensor and an actual position of the d-axis, in a rotating state of a rotor of the electric machine, in dependence on a d-voltage value, which describes a d component of a stator voltage specified by the control means in the initial configuration, a q voltage value which describes a q component of the stator voltage specified by the control means in the initial configuration, a flux value which describes a magnetic flux of the rotor, a rotational speed value which describes the rotational speed of the rotor in the rotating state, and a calibration value which describes a rotational speed-dependent voltage error of the d component of the stator voltage.

Furthermore, the invention relates to an inverter for an electric machine, comprising a power unit adapted to convert an input DC voltage into a polyphase AC current for the electric machine, and a control device according to the invention.

Further, the invention relates to a vehicle comprising an electric machine adapted to drive the vehicle and an inverter according to the invention adapted to provide the alternating current to the electric machine.

Finally, the invention also relates to a computer program comprising program code for carrying out a method according to the invention when the computer program is executed on a computing device.

All embodiments of the method according to the invention can be applied analogously to the control device according to the invention, the inverter according to the invention, the vehicle according to the invention and the computer program according to the invention, so that the advantages mentioned above can also be achieved with these.

Further advantages and details of the present invention will be apparent from the embodiments described below and from the drawings. These are schematic representations and show:

DETAILED DESCRIPTION OF THE INVENTION

Figure 1:
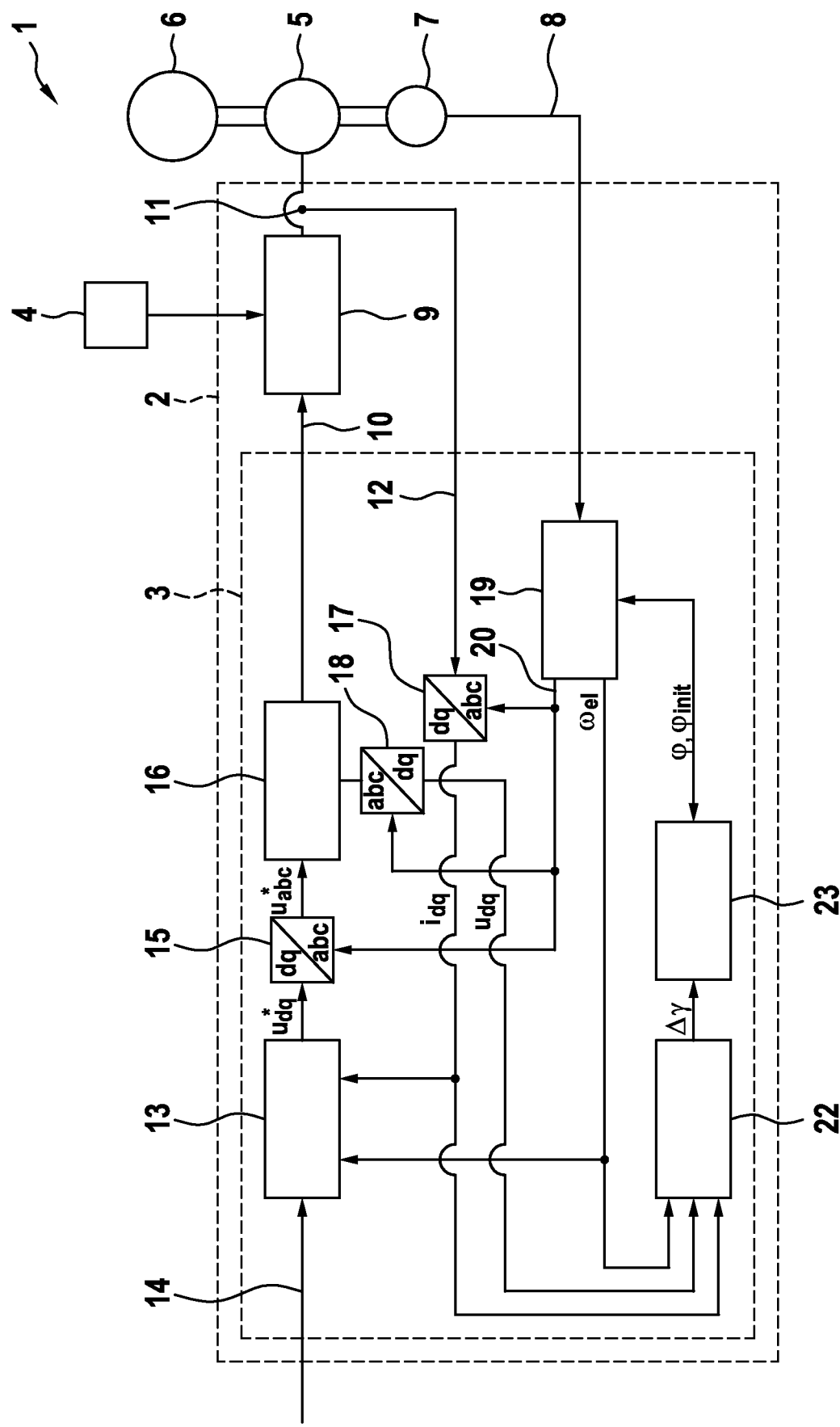
FIG. 1 is a block diagram of an embodiment of the vehicle according to the invention, comprising an embodiment of the inverter according to the invention with an embodiment of the control device according to the invention.

FIG. 1 is a block diagram of an embodiment of a vehicle 1, comprising an embodiment of an inverter 2 with an embodiment of a control device 3.

The vehicle 1 also has a DC voltage source 4 in the form of a high-voltage battery and an electric machine 5 which is set up to drive the vehicle 1 by mechanical coupling with a load 6. In the present embodiment, the electric machine 5 is a permanently excited synchronous machine. The electric machine 5 is assigned a rotor position sensor 7, for example a resolver, which is set up to provide rotor position information 8 to the control device 3.

In addition to the control device 3, the inverter 2 comprises a power unit 9, which has a plurality of power switching elements that can be controlled by means of the control device 3. On the basis of switching signals 10 from the control device 3, the power unit 9 converts the DC voltage provided by the DC voltage source 4 into a multiphase AC current for the electric machine 5. In addition, the inverter 2 comprises a current detection unit 11, which is set up to provide the control device 3 with current information 12 describing individual values of stator currents flowing along individual phases of the multiphase AC current.

The control device 3 comprises a control unit 13 which is set up to determine setpoint voltages in dq coordinates as a function of an externally supplied torque demand 14. The control unit 13 is followed by a transformation unit 15, which is used to convert the setpoint voltages $u^*_{dq}$ into nominal voltages $u^*_{abc}$ in abc coordinates. The control unit 3 also has a modulator unit 16 which is set up to convert setpoint voltages determined by the control unit 13, in this case the setpoint voltages $u^*_{abc}$ into the pulse-width-modulated switching signals 10 for the power unit 9, if necessary using limiting rules.

In addition, the control unit 3 has a further transformation unit 17, which is set up to transform the current information 12, which describes the stator current in abc coordinates, into individual values of the stator current $i_{dq}$ in dq coordinates, which the control unit 13 receives as actual values for control. A further transformation unit 18 receives an output signal of the modulation unit 16, which describes the voltages generated by the switching signals 10 in abc coordinates, and is used to transform these individual values into individual values of the stator voltage $u_{dq}$ which take into account modifications with respect to the nominal voltages $u^*_{dq}$.

The control device 3 further comprises an evaluation unit 19, which is set up to determine from the rotor position information 8 an electrical angular frequency $\omega_{el}$ of the rotor motion and a position information 20 describing the position of the d-axis of the dq-coordinate system.

Figure 2:
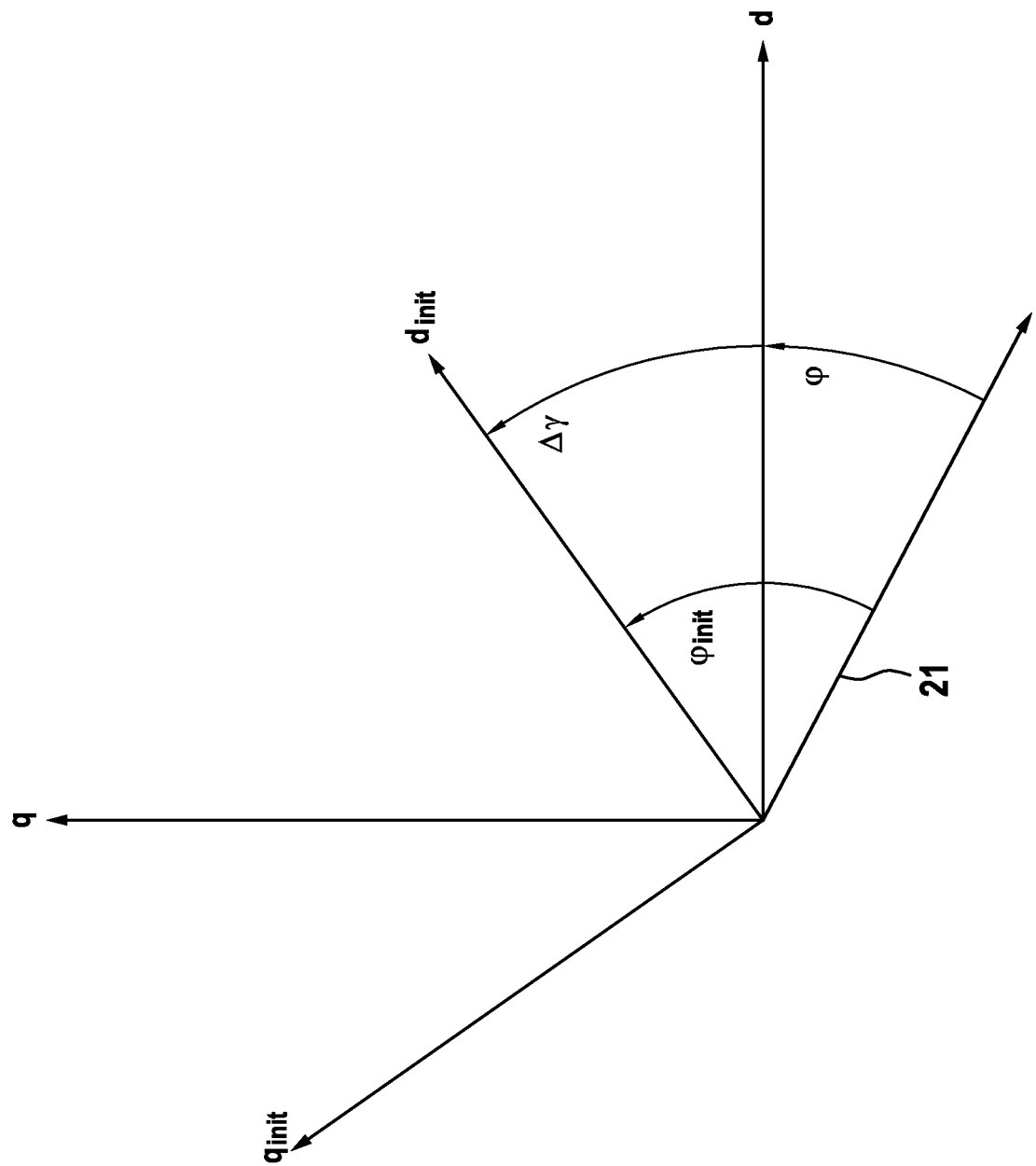
FIG. 2 is an initial and an actual dq coordinate system during operation of the control device according to the invention.

FIG. 2 shows an initial and an actual dq coordinate system during operation of the control device 3.

In an initial configuration of the control device, in which an offset of a zero axis 21 of the rotor position encoder with respect to an actual position d axis marked with d is not known, a position of the d axis marked with $d_{init}$ is assumed, which has an initial offset $\varphi_{init}$ with respect to the zero axis 21. Thereby FIG. 2 also shows corresponding orthogonal q-axes, marked with q for the actual position of the d-axis and with $q_{init}$ for the assumed position of the d-axis.

Consequently, it is necessary to determine a total correction value $\Delta\gamma$ which allows a correction of the initial offset $\varphi_{init}$ to an offset $\varphi$ better corresponding to the actual position of the d-axis.

Referring again to FIG. 1, the control device 3 has for this purpose a correction value determination unit 22 for determining the offset $\varphi$. By means of a writing unit 23 of the control device 3, the evaluation unit 19 can be configured in such a way that the position information 20 is no longer determined on the basis of the initial offset $\varphi_{init}$, but on the basis of the offset $\varphi$.

Figure 3:
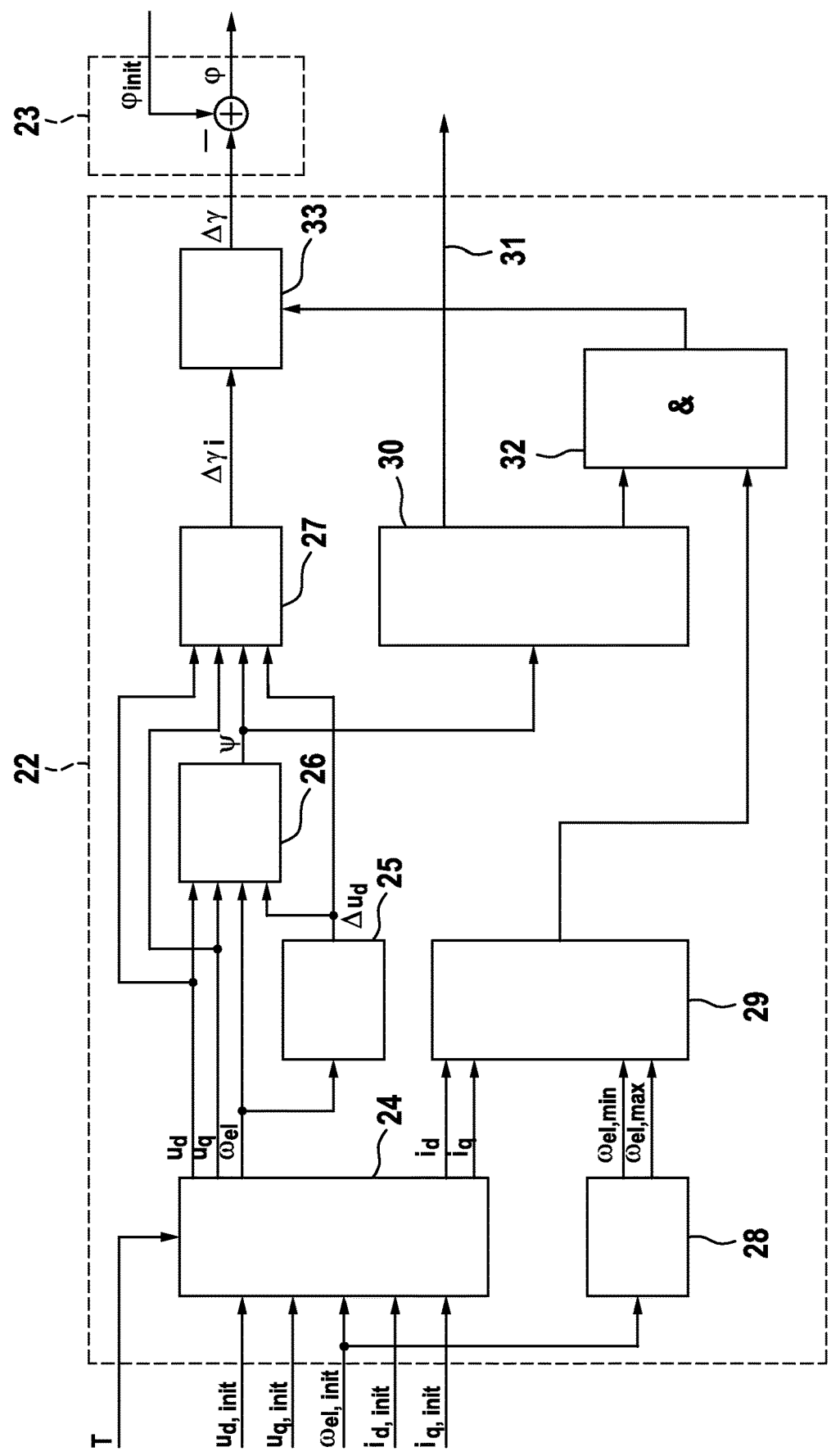
FIG. 3 is a block diagram of a correction value determination unit and a writing unit of the control device shown in FIG. 1.
Figure 4:
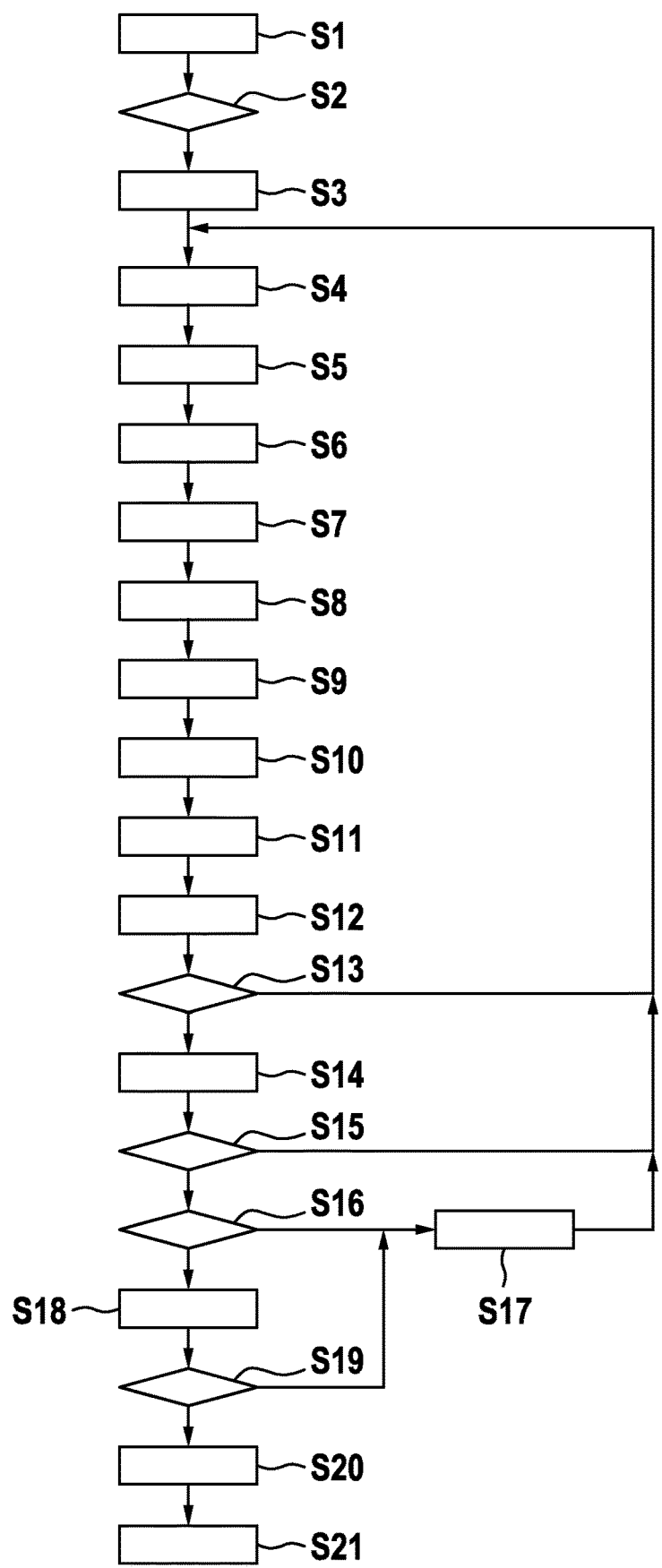
FIG. 4 is a flow diagram of an embodiment of the method according to the invention.

In this context, the control device 3 is set up to carry out a method which is explained below on the basis of a block diagram of the correction value determination unit 22 and the writing unit 23 shown in FIG. 3 and a flow diagram of the method shown in FIG. 4:

In an initial state S1 at the start of the method, the vehicle 1 is driving, with a rotor of the electric machine rotating at a certain speed and the control device being in the initial configuration. In a step S2, it is cyclically checked whether the control device 3 receives an external trigger signal T from a higher-level control device (not shown) of the vehicle 1, which starts the determination. After receiving the trigger signal T, in a step S3 the control unit 13 specifies the target voltages $u_{dq}^*$ such that a zero current is impressed in stator windings of the electric machine 5.

In a subsequent step S4, an averaging block 24 of the correction value determination unit 22 obtains, over an acquisition period comprising one or more complete electrical or mechanical periods of the electrical machine 5, a plurality of individual values of a d component of the stator voltage $u_{d,init}$ and a q-component of the stator voltage $u_{q,init}$ from the modulator unit 16 via the transformation unit 18, respectively. In addition, the averaging block 24 receives single values of a d-component of the stator current $i_{d,init}$ and a q-component of the stator current $i_{q,init}$ from the current detection unit 11 via the transformation unit 17 in each case. In addition, the first averaging block receives 24 individual values of the electrical angular frequency $\omega_{el,init}$. In a subsequent step S5, the averaging block 24 generates a d-voltage value $u_d$, a q-voltage value $u_q$, a speed value $\omega_{el}$, a d-voltage value $i_d$ and a q-voltage value $i_q$ from the respective individual values by averaging over the duration of the acquisition period.

Figure 5:
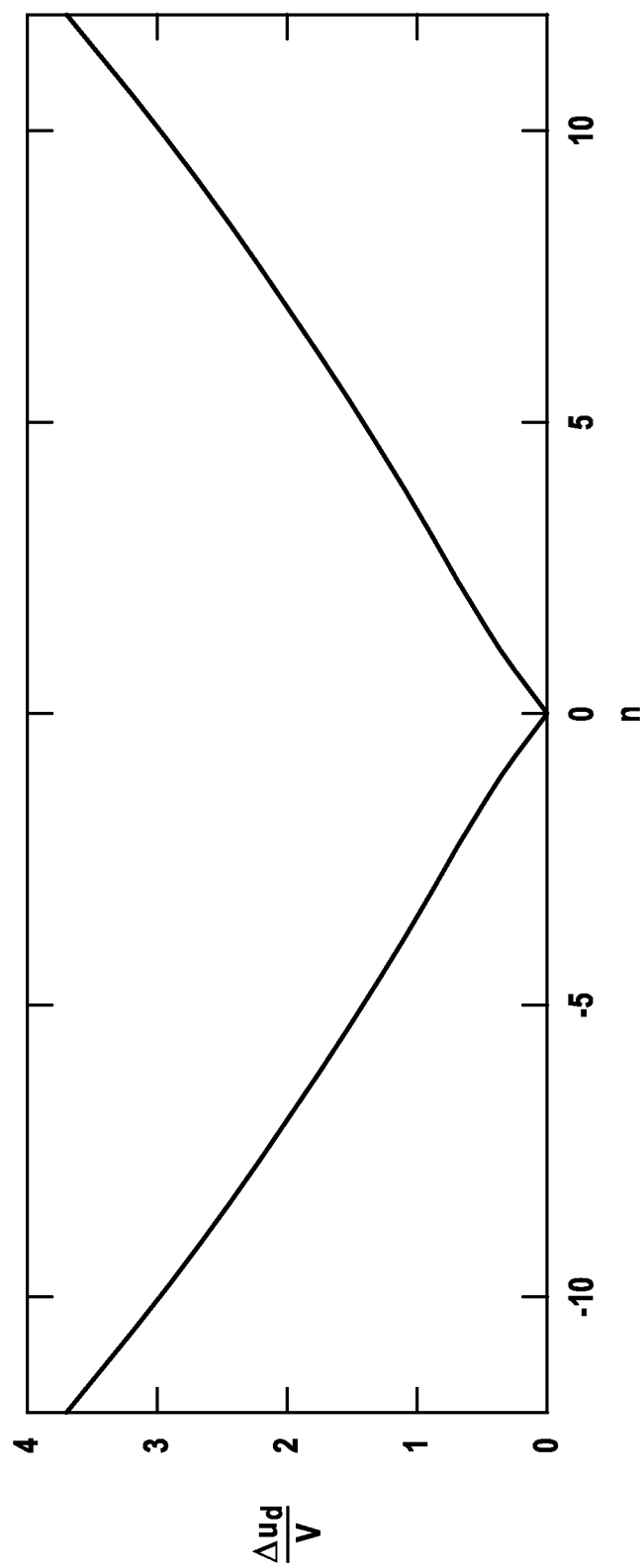
FIG. 5 is an exemplary curve of a voltage error over a mechanical speed.

In a following step S6, a calibration value determination block 25 of the correction value determination unit 22 determines from the speed value $\omega_{el}$ calibration value $\Delta u_d$, which describes a speed-dependent voltage error of the d component of the stator voltage. For this purpose, the calibration value determination block 25 reads, on the basis of the speed value $\omega_{el}$ a stored characteristic field, which assigns a calibration value to each of the speeds of the electric machine 5. FIG. 5 shows an exemplary course of a voltage error, which is described by the calibration value $\Delta u_d$ over a mechanical speed. The voltage error results from iron losses and timing errors and has been determined for the type of the electric machine 5 and the type of the inverter 2 before the start of the process and stored in a memory (not shown) of the control unit 3.

In a subsequent step S7, a flux value determination block 26 of the correction value determination unit 22 determines from the d-voltage value $u_d$, the q-voltage value $u_q$, the speed value $\omega_{el}$ and the calibration value $\Delta u_d$ according to the equation $$\Psi = \frac{\sqrt{u_d^2 + u_q^2 - \Delta u_d^2}}{\omega_{el}}$$

a flux value Ψ, which describes a magnetic flux of the permanent magnets of the rotor.

Subsequently, in a step S8, from the d-voltage value $u_d$, the q-voltage value $u_q$, the flux value Ψ, the speed value $\omega_{el}$ and the calibration value $\Delta u_d$ by means of a correction value calculation block 27 a correction value $\Delta\gamma_i$ according to the equation $$\Delta\gamma_i = \Delta\tan 2(\omega_{el}\cdot\Psi\cdot u_d - \Delta u_d\cdot q_q, \Delta u_d\cdot u_d + \omega_{el}\cdot\Psi\cdot u_q)$$

is calculated.

Subsequent to step S8 or in parallel with steps S5 to S8, an extreme value determination block 28 of the correction value determination unit 22 determines, in a step S9, a minimum value of the individual values of the electric angular frequency $\omega_{el,min}$ occurring during the detection period and a maximum value of the individual values of the electric angular frequency $\omega_{el,max}$ occurring during the detection period. In a subsequent step S10, which can also be performed in parallel with steps S5 to S8, a plausibility check block 29 of the correction value determination unit 22 checks a condition for quasi-stationary operation of the electric machine 5 during the detection period. For this purpose, on the one hand, based on the minimum value $\omega_{el,min}$ and the maximum value $\omega_{el,max}$, it is determined whether the individual values detected during the detection period are within a predetermined speed interval and, on the other hand, whether the d-current value $i_d$ and the q current value $i_q$ lie within a current interval comprising zero.

Subsequent to step S10, in a step S11, which can alternatively be performed in parallel with steps S7 and S8, a flow value checking block 30 of the correction value determining unit 22 checks whether the determined flow value is ψ is below a predetermined maximum flow value and above a predetermined minimum flow value. If the determined flow value ψ is below the minimum flux value, the flux value checking block 30 additionally outputs demagnetization information 31 indicating demagnetization of the permanent magnets.

The subsequent steps S12 to S19 described below are performed by an overall correction value calculation block 33 of the correction value determination unit 22. In step S12, a first counter which counts the number of determined correction values $\Delta\gamma_i$ is incremented. Then, in a step S13, it is evaluated whether the conditions checked in steps S10 and 511 and cumulatively linked by a logic block 32 are satisfied. If this is not the case, the determined correction value $\Delta\gamma_i$ is considered unreliable and a new correction value $\Delta\gamma_{i+1}$ is determined by returning to step S4.

If the evaluation in step S13 is positive, the correction value $\Delta\gamma_i$ can be considered as reliable, so that in a subsequent step S14 a second counter counting the number of reliable correction values $\Delta\gamma_i$ is incremented and the correction value $\Delta\gamma_i$ is stored. In a step S15, it is then evaluated whether the first counter has reached a predetermined value of, for example, twenty correction value determinations. If this is not the case, the program returns to step S4 so that a further correction value $\Delta\gamma_{i+1}$ is determined.

If the evaluation in step S15 shows that a sufficient number of correction value determinations have been carried out, it is evaluated in a step S16 whether the second counter has a predetermined minimum value of, for example, eighteen correction values $\Delta\gamma_i$ considered reliable. If this is not the case, the counters are reset in step S17 and previously stored correction values $\Delta\gamma_i$ are deleted. The program then returns to step S4 to determine a new set of correction values $\Delta\gamma_i$.

If the evaluation in step S16 is successful, an average value of the stored correction values $\Delta\gamma_i$, i.e., the values considered reliable, is determined in step S18. In a step S19, a deviation measure for the mean value is evaluated by checking whether a minimum value and a maximum value of the correction values $\Delta\gamma_i$ lie within an interval defined around the mean value. If this is not the case, a jump is made to step S17 and a new set of correction values $\Delta\gamma_i$ is determined. If the evaluation in step S19 is positive, the mean value is output in a step S20 as total correction value $\Delta\gamma$ to the writing unit 23.

In a step S21, the writing unit 23 determines from the initial offset $\varphi_{init}$ and the total correction value $\Delta\gamma$ by difference formation the offset φ and writes this to the evaluation unit 19, thus ending the process.

In the further operation of the electric machine 5 or of the vehicle 1, the position information 20 is thus determined much more precisely on the basis of the offset φ which enables a more precise control of the electric machine 5. The procedure is carried out for the first time immediately after initial commissioning of the vehicle 1, in order to correct the factory-set initial offset $\varphi_{init}$ as quickly as possible. Thereafter, the procedure is restarted by the trigger signal T, for example, when after maintenance or repair of the vehicle 1 or after expiration of a predetermined use of the vehicle, there is a need to check the reliability of the offset φ which is used as the initial offset $\varphi_{init}$ when the procedure is carried out again.

According to further embodiments, the electric machine 5 is an electrically excited synchronous machine. In this case the flux value W describes the rotor flux concatenated with the stator at a stator current of zero value and the demagnetization information 31 is omitted.

According to a further embodiment, averaging by the total correction value calculation block 33 in steps S11 to S18 is omitted, and a correction value $\Delta\gamma_i$ determined to be reliable for correction of the initial offset $\varphi_{init}$ is output to the writing unit 23.

According to a further embodiment, in step S1 the electric machine 5 is operated on a test bench, for example as part of an end-of-line test, against a load machine at a predetermined speed. The determination of the calibration value $\Delta u_d$ is omitted in favor of a calibration value $\Delta u_d$ which is fixed for the rotational speed. Steps S4, S5, S9 and S10 can then be omitted and individual values can be used as the d voltage value, q voltage value and speed value.

According to a further embodiment, there is no return after step S17, but a signal indicating unsuccessful determination is output to the higher-level control unit (not shown). The vehicle control unit can then output the trigger signal T again.

The invention claimed is:

1. Method for determining a correction value for a control device for an electric machine, the correction value describing an angular difference between a position of a d-axis of the electric machine assumed in an initial configuration of the control device on a basis of rotor position information of a rotor position sensor and an actual position of the d-axis, a zero current being impressed in stator windings of the electric machine and the correction value being determined in a rotating state of a rotor of the electric machine as a function of a d-voltage value describing a d-component of a stator voltage specified by the control device in the initial configuration, of a q-voltage value describing a q-component of the stator voltage specified by the control device in the initial configuration,
of a flux value describing a magnetic flux of the rotor,
of a speed value describing a speed of the rotor in the rotating state, and
of a calibration value describing a speed-dependent voltage error of the d component of the stator voltage,
wherein the flux value is determined as a function of the d-voltage value and the q-voltage value and the speed value as an additional function of the calibration value.

2. Method according to claim 1, wherein the calibration value is read out on a basis of the speed value from a stored characteristic diagram which assigns the calibration value to speeds of the electric machine in each case, or is fixed for a speed in the rotating state of the rotor.

3. Method according to claim 1, wherein setpoint voltage values of a control unit of the control device are used as the predetermined stator voltage or the predetermined stator voltage is determined from output signals of a modulator unit of the control device which provides switching signals for a power unit of an inverter.

4. Method according to claim 1, wherein the electric machine is a permanently excited electric machine and the flux value describes the magnetic flux of permanent magnets of the rotor, or wherein the electric machine is an electrically excited electric machine and the flux value describes the rotor flux concatenated with the stator.

5. Method according to claim 1, wherein a determined correction value is rejected as unreliable if the determined flow value is above a predetermined maximum flow value and/or if the determined flow value is below a predetermined minimum flow value.

6. Method according to claim 1, wherein the d-voltage value, the q-voltage value and the speed value are determined as a function of mean values of respective individual values acquired over an acquisition period comprising one or more complete electrical or mechanical periods.

7. Method according to claim 6, wherein a plausibility check verifying a quasi-stationary operation of the electric machine is performed during the acquisition period of the individual values and a correction value is rejected as unreliable if the plausibility check reveals a violation of a predetermined condition for the quasi-stationary operation.

8. Method of claim 7, wherein the condition comprises that individual values used to determine the speed value are within a predetermined speed interval and/or that a d-current value describing an average of individual values of a d-component of a stator current detected during the detection period and a q-current value describing an average of individual values of a the d-component of the stator current detected during the detection period are within a current interval comprising zero.

9. Method according to claim 7, wherein a plurality of correction values are determined in a predetermined or predeterminable number of successive determination cycles and an overall correction value is used as the average of the correction values determined in the determination cycles, if
the number of correction values rejected as unreliable during the respective plausibility check does not exceed a predefined maximum value and/or
the deviation of the correction values determined in the determination cycles from each other does not exceed a specified deviation measure.

10. A computer program comprising program code for carrying out a method according to claim 1, when the computer program is executed on a computing device.

11. Method for determining a correction value for a control device for an electric machine, the correction value describing an angular difference between a position of a d-axis of the electric machine assumed in an initial configuration of the control device on a basis of rotor position information of a rotor position sensor and an actual position of the d-axis, a zero current being impressed in stator windings of the electric machine and the correction value being determined in a rotating state of a rotor of the electric machine as a function:
of a d-voltage value describing a d-component of a stator voltage specified by the control device in the initial configuration,
of a q-voltage value describing a q-component of the stator voltage specified by the control device in the initial configuration,
of a flux value describing a magnetic flux of the rotor,
of a speed value describing a speed of the rotor in the rotating state, and
of a calibration value describing a speed-dependent voltage error of the d component of the stator voltage,
wherein the following equation is evaluated to determine the correction value:

$$\Delta\gamma = \gamma \tan(\omega_{el} \cdot \Psi \cdot u_d - \Delta u_d \cdot u_q, \Delta u_d \cdot u_d + \omega_{el} \cdot \Psi \cdot u_q),$$

where
$\alpha \tan(x, y)$ describes an arc tangent function or an arc cotangent function, in particular $$\arctan\left(\frac{x}{y}\right) \text{ or } \operatorname{arccot}\left(\frac{y}{x}\right)$$

or $\alpha \tan 2(x, y)$ or $\alpha \cot 2(y, x)$,
$u_d$ describes the d-voltage value,
$u_q$ describes the q-voltage value,
$\Psi$ describes the flux value,
$\omega_{el}$ describes the speed value, and
$\Delta u_d$ describes the calibration value.

12. A control device for an electric machine, which is arranged to impress a zero current into stator windings of the electric machine, and to determine a correction value describing an angular difference between a position of a d-axis of the electric machine assumed in an initial configuration of the control device on a basis of rotor position information of a rotor position sensor and an actual position of the d-axis in a rotating state of a rotor of the electric machine in dependence
of a d-voltage value describing a d-component of a stator voltage specified by the control device in the initial configuration,
of a q-voltage value describing a q-component of the stator voltage specified by the control device in the initial configuration,
of a flux value describing a magnetic flux of the rotor,
of a speed value describing the speed of the rotor in the rotating state, and
of a calibration value describing a speed-dependent voltage error of the d-component of the stator voltage, and
wherein the flux value is determined as a function of the d-voltage value and the q-voltage value and the speed value as an additional function of the calibration value.

13. An inverter for the electric machine, comprising a power unit adapted to convert an input DC voltage into a polyphase AC current for the electric machine, and the control device according to claim 12.

14. A vehicle comprising the electric machine to drive the vehicle and the inverter according to claim 13 adapted to provide the alternating current to the electric machine.

* * * * *